United States Patent
Nishiguchi

[11] Patent Number: 5,978,064
[45] Date of Patent: Nov. 2, 1999

[54] LIQUID CRYSTAL DISPLAY DEVICE AND METHOD FOR FABRICATING THE SAME

[75] Inventor: Kenji Nishiguchi, Osaka, Japan

[73] Assignee: Sharp Kabushiki Kaisha, Osaka, Japan

[21] Appl. No.: 08/921,940

[22] Filed: Aug. 27, 1997

[30] Foreign Application Priority Data

Sep. 6, 1996  [JP]  Japan .................................. 8-237047

[51] Int. Cl.⁶ ........................ G02F 1/1333; G02F 1/1339
[52] U.S. Cl. ............................... 349/156; 349/86; 349/93
[58] Field of Search ............................. 349/86, 93, 156, 349/187

[56] References Cited

U.S. PATENT DOCUMENTS

| 5,473,450 | 12/1995 | Yamada et al. | 359/51 |
| 5,643,471 | 7/1997 | Onishi et al. | 349/84 |
| 5,729,312 | 3/1998 | Yamagishi et al. | 349/86 |

FOREIGN PATENT DOCUMENTS

| 56-99384 | 8/1981 | Japan . |
| 59-201021 | 11/1984 | Japan . |
| 7-287241 | 10/1995 | Japan . |
| 8-160396 | 6/1996 | Japan . |

Primary Examiner—William L. Sikes
Assistant Examiner—Joanne Kim
Attorney, Agent, or Firm—Dike, Bronstein, Roberts & Cushman, LLP; David G. Conlin; George W. Neuner

[57] ABSTRACT

A liquid crystal display device includes a pair of substrates and a display medium interposed therebetween, the display medium including a liquid crystal region and a polymer wall surrounding the liquid crystal region. The display medium is formed by injecting between the substrates a mixed material containing a liquid crystal material and a resin material which includes at least photopolymerizable monomer, and irradiating said mixed material with light. A content y (%) of the resin material in the mixed material has a relationship, $$0.3*(100-x) \leq y \leq (100-x)$$

for a pixel aperture ratio x (%).

16 Claims, 3 Drawing Sheets

LIQUID CRYSTAL DISPLAY DEVICE AND METHOD FOR FABRICATING THE SAME

BACKGROUND OF THE INVENTION

1. Field of the Invention

The present invention relates to a liquid crystal display device and a method for fabricating the same. More particularly, the present invention relates to a liquid crystal display device having excellent display quality, impact resistance and pressure resistance, as well as a liquid crystal display device which can be obtained at a lower cost with excellent productivity, and a method for fabricating the same.

2. Description of the Related Art

Liquid crystal display devices having various display modes have been known in the art, including a liquid crystal display device having a non-scattering mode such as a twisted nematic (TN) mode, a super twisted nematic (STN) mode, an electrically controlled birefringency (ECB) mode, a ferroelectric liquid crystal (FLC) mode; and a liquid crystal display device having a scattering mode such as a polymer dispersed-type liquid crystal (PDLC) mode.

A conventional liquid crystal display device includes a pair of substrates and a display medium containing at least liquid crystal interposed therebetween. When such a liquid crystal display device is utilized for a portable information terminal having a pen-input function, there is a problem that the orientation of the liquid crystal molecules will be disturbed due to the reduction of the gap between the substrates caused by the pressure at the time of the pen input, which results in the disturbance of the display in the liquid crystal display device.

In order to solve such a problem, a liquid crystal display device having improved impact resistance and pressure resistance has been proposed by providing a polymer wall or polymer columns in the periphery of the liquid crystal region to reduce the variation of the gap.

For example, a liquid crystal display device comprising a polymer column selectively provided in a non-pixel portion using a resist and which is used as a spacer (Japanese Laid-open Patent Publication No. 56-99384), and a liquid crystal display device comprising a polymer column selectively provided in stripes in a non-pixel portion using a photosensitive resin (Japanese Laid-open Patent Publication No. 59-201021), have been known.

In Japanese Laid-open Patent Publication No. 6-301015, the applicant proposed a liquid crystal display device shown in FIG. 3A as having improved impact resistance. The liquid crystal display device 300 includes a pair of substrates 101$a$ and 101$b$, and a display medium interposed therebetween, the display medium having a liquid crystal region 106 provided in a pixel portion and a polymer wall 107 surrounding the liquid crystal region 106. In the fabrication of the liquid crystal display device 300, as shown in FIG. 3B, a mixed material 113 containing a liquid crystal material, a photopolymerizable monomer and a photopolymerization initiator is injected between a pair of substrates 101$a$ and 101$b$, and a photomask 114 having a light-shading portion 110 and a light-transmitting portion 111 is disposed on one of the substrate 101$a$ so that the pixel portion is covered with the shading portion 110, and then the mixture 113 is irradiated with ultraviolet light 108 through the photomask 114. The photopolymerizable monomer is polymerized and the resulting polymer gathers in the portion corresponding to the light-transmitting portion 111 (irradiated portion) of the photomask 114, while the liquid crystal material gathers in the portion corresponding to the light-shading portion 110 (non-irradiated portion), which results in a display medium having the liquid crystal region 106 in the pixel portion and the polymer wall 107 in the non-pixel portion. According to this liquid crystal display device, it is possible to improve the impact resistance by using the polymer wall 107 provided in the non-pixel portion, as shown in FIG. 3A. It is also possible to accomplish wide viewing angle characteristics in the liquid crystal display panel by axisymmetrically orienting the liquid crystal molecules in the pixel due to the interaction between the polymer and the liquid crystal material. Such a mode as axisymmetrically orienting the liquid crystal molecules in the pixel is hereinafter referred to as an axisymmetrically orienting mode.

Moreover, the applicant proposed in Japanese Laid-Open Patent Publication No. 7-287241 a liquid crystal display device which provides a liquid crystal region in the pixel portion without any photomask by using a transparent electrode which does not readily transmit light, and also enables the polymer wall to precisely conform to the outlines of the pixel and the liquid crystal region.

However, the liquid crystal display device having such a polymer wall or a polymer column as discussed above has the following problems.

The liquid crystal display device having a polymer wall or a polymer column formed from a resist or a photosensitive resin requires an additional photolithography step so as to precisely form the polymer wall or the polymer column in the non-pixel portion. Therefore, such a liquid crystal display device provides very poor production efficiency.

In such a liquid crystal display device as shown in FIG. 3A, it is necessary to dispose the photomask 114 so that the light shading portion 110 of the photomask 114 conforms to the pixel portion. Therefore, again, such a liquid crystal display device provides very poor production efficiency.

A liquid crystal display device using a transparent electrode which does not readily transmit a light having the prescribed wavelength provides improved productivity, since it is not necessary to adjust the location of the photomask, and the like. However, the polymer wall may be undesirably formed over the pixel portion, or polymer pieces may remain in the pixel portion in such a liquid crystal display device, which results in a reduction of the aperture ratio of the liquid crystal display device which causes a darkening of the display, and the poor orientation of the liquid crystal molecules causes increased roughness of the display. Moreover, sometimes the liquid crystal region is not sufficiently surrounded by the polymer wall in the liquid crystal display device, and in this case the display device has insufficient pressure resistance.

In such a liquid crystal display device, a method of precisely providing the liquid crystal region in the pixel portion and the polymer wall in the non-pixel portion by suitably phase-separating the liquid crystal material from the polymer has been employed. Thus, the polymer wall is prevented from being undesirably formed over the pixel portion and thus from affecting the display quality. Additionally, the liquid crystal region is surrounded by the polymer wall, thereby improving the impact resistance of the liquid crystal display device. However, in this method, since a special thin layer or a special process for improving the degree of separation of the liquid crystal material from the polymer is required, the production cost is increased.

As described above, a liquid crystal display device having excellent display quality, impact resistance and pressure resistance, which can be obtained at a lower cost with excellent productivity, has been demanded.

SUMMARY OF THE INVENTION

The liquid crystal display device of this invention includes a pair of substrates and a display medium interposed therebetween, the display medium comprising a liquid crystal region and a polymer wall surrounding said liquid crystal region. The display medium is formed by injecting a mixed material containing a liquid crystal material and a resin material which includes at least photopolymerizable monomer between the substrates, and irradiating said mixed material with light. A content y (%) of the resin material in the mixed material has a relationship, $$0.3*(100-x) \leq y \leq (100-x)$$

for a pixel aperture ratio x (%).

In one embodiment of the invention, the content y (%) of the resin material in the mixed material has a relationship, $$0.5*(100-x) \leq y \leq 0.7*(100-x)$$

for the pixel aperture ratio x (%).

In another embodiment of the invention, the resin material contains at least one of an acrylate and a methacrylate having a backbone similar to that of a liquid crystal.

In still another embodiment of the invention, the resin material contains at least one of a bifunctional or higher acrylate and methacrylate.

In still another embodiment of the invention, the resin material further includes a photopolymerization initiator.

According to another aspect of the invention, a method for fabricating a liquid crystal display device including a pair of substrates and a display medium interposed therebetween, said display medium including a liquid crystal region and a polymer wall surrounding the liquid crystal region, is provided. The method comprises the steps of: injecting between said substrates a mixed material containing a liquid crystal material and a monomer material which includes at least photopolymerizable monomer; and irradiating with light a prescribed location of said substrates between which said mixed material has been injected so as to form the display medium. The content y (%) of said resin material in said mixed material has a relationship, $$0.3*(100-x) \leq y \leq (100-x)$$

for the pixel aperture ratio x (%).

In one embodiment of the invention, the content y (%) of the resin material in the mixed material has a relationship, $$0.5*(100-x) \leq y \leq 0.7*(100-x)$$

for the pixel aperture ratio x (%).

In another embodiment of the invention, the resin material contains at least one of an acrylate and a methacrylate having a backbone similar to that of a liquid crystal.

In still another embodiment of the invention, the resin material contains at least one of a bifunctional or higher acrylate and methacrylate.

In still another embodiment of the invention, the resin material further includes a photopolymerization initiator.

Thus, the invention described herein makes possible the advantages of (1) providing a liquid crystal display device having excellent display quality, impact resistance and pressure resistance, as well as which can be obtained at a lower cost with excellent productivity; and (2) providing a simple method for fabricating such a liquid crystal display device.

These and other advantages of the present invention will become apparent to those skilled in the art upon reading and understanding the following detailed description with reference to the accompanying figures.

DESCRIPTION OF THE PREFERRED EMBODIMENTS

In the present specification, the term "a pixel aperture ratio x (%) of a liquid crystal display device" is referred to as a ratio (%) of the area of the pixel portion to the area of the overall display region. For example, when the pixel pitch and electrode width in one of a pair of substrates oppositely disposed to each other as interposing the display medium are A and a, respectively, and when the pixel pitch and electrode width in the other substrate are B and b, respectively, the pixel aperture ratio x (%) is represented by the product of the electrode widths divided by the product of the pixel pitches as follows.

$$x = \{(a*b)/(A*B)\}*100.$$

Also, the term "a liquid crystal region surrounded by a polymer wall" includes a liquid crystal region whose periphery is entirely surrounded by a polymer wall, and a liquid crystal region whose periphery is partially surrounded by a polymer wall.

The following specifically illustrates the preferred embodiments of the present invention, but the present invention is not limited to these embodiments.

Embodiment 1

Figure 1:
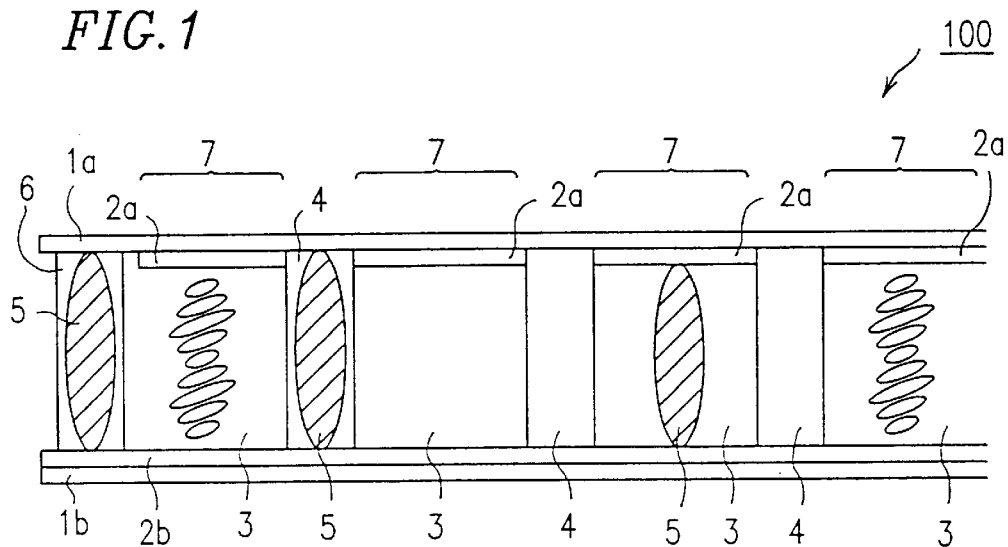
FIG. 1 is a schematic sectional view showing a liquid crystal display device in a preferred embodiment according to the present invention.

FIG. 1 is a schematic sectional view showing the liquid crystal display device according to the present embodiment. The liquid crystal display device 100 includes a pair of substrates 1a and 1b oppositely disposed about a spacer 5 with a predetermined gap, and the edges of the substrates are sealed and held together with a sealant 6. A display medium having a liquid crystal region 3 provided in a pixel portion 7 and a polymer wall 4 surrounding the liquid crystal region 3 is disposed between the pair of substrates 1a and 1b.

A plurality of band-shaped transparent electrodes 2a consisting, for example, of ITO (indium tin oxide) are formed on the display medium side of one substrate 1a, while a plurality of band-shaped transparent electrodes 2b consisting, for example, of ITO are formed on the display medium side of the other substrate 1b so that the transparent electrodes 2a and 2b are aligned to cross each other (the electrode lines cross each other at a right angle in the present embodiment). An electric insulating film and an alignment film (neither of which is shown in the figure) are provided in this order from the side of the transparent electrodes between the above-described transparent electrodes 2a and 2b and the display medium.

The liquid crystal display device is fabricated as described below.

First, a plurality of band-shaped transparent electrodes 2a are formed on one side of the substrate 1a, and a plurality of band-shaped transparent electrodes 2b are formed on one side of the other substrate 1b. The transparent electrodes are formed, for example, by sputtering ITO. The width and thickness of the electrodes, and the interval between the electrodes may suitably be varied depending upon the applications of the liquid crystal display device. In the present embodiment, the transparent electrodes 2a and 2b are formed at a width of 280 μm, an interval of 20 μm and a thickness of 200 nm.

Optionally, an electric insulating film is formed so as to cover the transparent electrodes 2a and 2b. The electric insulating film is formed by, for example, sputtering $SiO_2$. The thickness of the electric insulating film is preferably in the range of 50 nm to 300 nm, more preferably in the range of 70 nm to 100 nm.

Optionally, an alignment film may be formed on the electric insulating film. For example, the alignment film is formed in the case of fabricating a liquid crystal display device of TN mode or STN mode, while an alignment film is not formed in the case of fabricating a liquid crystal display device having an axisymmetrically orienting mode. In the present embodiment, an alignment film is formed using an organic material (for example, polyimide), and the prescribed orientation treatment (for example, rubbing treatment using a nylon cloth) is conducted. The thickness of the alignment film is preferably in the range of 30 nm to 200 nm, more preferably 50 nm to 100 nm.

Then, a pair of substrates 1a and 1b are oppositely disposed through a spacer 5 so that the transparent electrodes 2a and 2b cross each other (the electrode lines cross each other at right angle in the present embodiment). The transparent electrodes 2a and 2b need not to cross each other at strictly right angles, so long as they cross each other. The end portions of the both substrates 1a and 1b are sealed and held together with a sealant 6. At this time, sealant is not provided on a part of the substrate end portions. The part in which the sealant is not provided serves as an injection inlet for a mixed material described below.

A mixed material 113 containing a liquid crystal material and a monomer material comprising at least photopolymerizable monomer is injected between the pair of substrates 1a and 1b through the injection inlet provided at the end portion of the substrates 1a and 1b (hereinafter, "a monomer material" is also referred to as "a resin material").

The liquid crystal materials are not specifically limited, but include any suitable liquid crystal materials. For example, any liquid crystal material used for liquid crystal display device having a TN mode, an STN mode, an ECB mode, a ferroelectric liquid crystal mode, a light-scattering mode and an axisymmetrically orienting mode can be used. The present embodiment uses ZLI-4427 (manufactured by Merck & Co., Inc.) comprising 0.3% of a chiral agent (S-811) added thereto.

Examples of the photopolymerizable monomer include p-phenylstyrene which is a styrene-type photopolymerizable monomer; adamantyl acrylate, isobornyl acrylate, R-694 (all of which are manufactured by Nippon Kayaku, Co., Ltd.) and stearyl acrylate (manufactured by Nippon Oil & Fats Co., Ltd.) which are monofunctional acrylates; and perfluoro methacrylate (Nippon Kayaku, Co., Ltd.) and t-butyl methacrylate (Nippon Oil & Fats Co., Ltd.) which are monofunctional methacrylates.

Also, polyfunctional (bifunctional or higher) acrylates and methacrylates can be used as the photopolymerizable monomer. Examples of polyfunctional acrylates and methacrylates include SR-2000 and R-684 (both of which are manufactured by Nippon Kayaku, co., Ltd.) which are bifunctional acrylates; hexanediol dimethacrylate (HDDMA) (manufactured by Nippon Kayaku, co., Ltd.) which is a bifunctional methacrylate; and trimethylolpropane trimethacrylate (TMPTMA) (manufactured by Nippon Oil & Fats Co., Ltd.) which is a trifunctional methacrylate. The use of the polyfunctional acrylate or methacrylate results in a polymer having a crosslinked structure. Thus, the molecular structure of the polymer after the polymerization step is very different from that of the resin material (monomer, dimer, oligomer, and the like) before polymerization. As a result of the different molecular structure, the polymer having a crosslinked structure is not soluble in a liquid crystal material. Therefore, it is possible to suitably phase-separate the liquid crystal material and the photopolymerized resin (i.e., polymer). Moreover, the use of the polyfunctional acrylate or methacrylate results in a polymer wall having excellent thermal resistance, since the resulting polymer is crosslinked. These photopolymerizable monomers may be used alone or in combination.

Optionally, the above-described resin material may contain an acrylate and/or methacrylate having a backbone similar to that of a liquid crystal. Examples of acrylates and methacrylates having a backbone similar to that of a liquid crystal include those represented by the following chemical formulae (I) and (II):

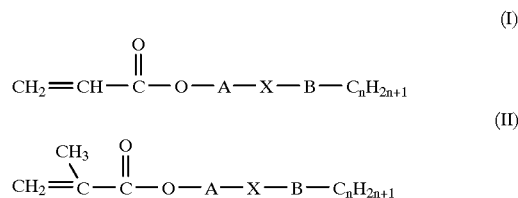

wherein each of A and B is

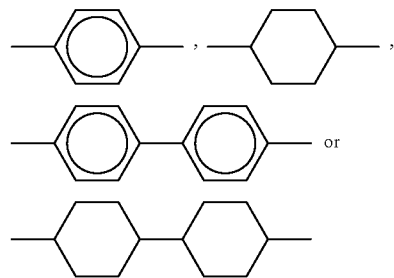

X is —C≡C— or —COO—; and n is 0 to 9, preferably 3 to 5. Each of B and X may be a single bond.

Since an acrylate or a methacrylate having a backbone similar to that of a liquid crystal material is highly compatible with the liquid crystal material, it is possible to increase its content in the mixed material, with the following benefits.

In the case of not using an acrylate or methacrylate having a backbone similar to that of a liquid crystal, it is difficult to increase the content of the resin material in the mixed material. The increased content of the photopolymerizable monomer results in markedly poor compatibility between the resin material and the liquid crystal material which may lead to a poor display property. On the other hand, in the case of using an acrylate or a methacrylate having a backbone similar to that of a liquid crystal material, the increased content of the resin material in the mixed material does not cause such a problem as the deteriorated compatibility between the resin material and the liquid crystal material. Therefore, it is possible to widely vary the content y (%) of the resin material in the mixed material (hereinafter, referred to as "resin content of the mixed material") without affecting the display property of the resulting liquid crystal display device. The acrylate or methacrylate having a backbone similar to that of a liquid crystal may be used alone or in combination.

Optionally, the above-described resin material may contain a photopolymerization initiator. Examples of the photopolymerization initiators include Irgacure 651 (manufactured by Ciba-Geigy, Inc.).

The resin content y (%) of the mixed material is in the range, $0.3*(100-x) \leq y \leq (100-x)$ for the pixel aperture ratio x (%) of the liquid crystal display device. If the resin content y (%) of the mixed material is more than 0.3 times of $(100-x)$ (i.e., the ratio of the area of the non-pixel portion to the area of the total display region), the liquid crystal region is suitably surrounded by the polymer wall, which may result in a liquid crystal display device having sufficient impact resistance against such a pressure as a pen input. If the resin content y (%) is less than $(100-x)$, the polymer wall is not undesirably formed over the pixel portion and polymer pieces do not remain in the liquid crystal region, which results in a liquid crystal display device having a higher aperture ratio and excellent display properties. Preferably, the resin content y (%) of the mixed material is in the range of $0.5*(100-x) \leq y \leq 0.7*(100-x)$ for the pixel aperture ratio x (%) of the liquid crystal display device. If the resin content y is within this range, it is possible to provide the liquid crystal region and the polymer wall in such a manner that the polymer wall surrounds the liquid crystal region corresponding to each pixel. In addition, it is possible to reduce a portion in which the polymer wall is incompletely formed (hereinafter referred to as a polymer wall breakage), and to reduce the undesirable formation of the polymer wall over the pixel portion. Therefore, a bright liquid crystal display device having good display properties can be obtained. In the present embodiment, a mixed material having the composition shown in the following Table 1 was actually prepared (the details of the evaluation of the liquid crystal display device thus fabricated will be discussed below). The pixel aperture ratio x (%) of the liquid crystal display device, and the resin content y (%) of the mixed material are defined as shown in the following Table 2. As shown in Table 2, the resin content y (%) of the mixed material satisfies the range, $0.3*(100-x) \leq y \leq (100-x)$ for the pixel aperture ratio x (%) of the liquid crystal display device.

The mixed material is injected between the substrates $1a$ and $1b$ using any suitable method (for example, vacuum injection method). Any suitable temperature is selected as the temperature at the time of the injection. In the present embodiment, the mixed material is injected between the substrates at a temperature of about 30° C.

After the injection of the mixed material, the inlet is sealed. Examples of the method of sealing the inlet include a method of using an ultraviolet curable resin and irradiating the ultraviolet curable resin with ultraviolet light in such a manner that the portions other than the inlet hole are not irradiated; and a method of sealing the inlet using a two-component system adhesive, an instantaneous adhesive, a visible light curable resin, or the like.

Subsequently, the mixed material injected between the substrates $1a$ and $1b$ is irradiated with ultraviolet light from outside the substrates. Any suitable conditions may be used as the irradiation conditions of the ultraviolet light. In the present embodiment, a high pressure mercury lamp for ultraviolet (UV) irradiation which provides parallel light is used as a light source, and a photomask is placed at such a location that provides an irradiation intensity of 10 mW/cm$^2$ (wavelength; 365 nm), and then the irradiation is conducted for 3 minutes. The photomask is placed such that the light-shading portion thereof corresponds to a pixel portion. The irradiation results in the formation of the liquid crystal region 3 in the pixel portion which corresponds to a light-shading portion of the photomask and the formation of the polymer wall 4 in the non-pixel portion. As a result, a display medium having the liquid crystal region 3 and the polymer wall 4 surrounding the liquid crystal region 3 is obtained. When an inorganic film (for example, ITO film) or an organic film which absorbs a light having a wavelength in the ultraviolet range is provided in such a manner to correspond to the pixel portion, the irradiation may be conducted without any photomask. For example, in the liquid crystal display device according to the present embodiment in which a pixel is formed in the overlapping portion of the transparent electrode $2a$ on the substrate $1a$ and the transparent electrode $2b$ on the substrate $1b$, since the pixel portion is shaded by the transparent electrodes $2a$ and $2b$, it is possible that the pixel portion conforms to the light-shading portion without using any photomask, which will result in a display medium comprising the liquid crystal region 3 provided in the pixel portion and the polymer wall 4 surrounding the liquid crystal region.

Preferably, the irradiation may be conducted at a temperature at which the mixed material is isotropic. The irradiation at such a temperature may result in excellent phase separation of the liquid crystal material and the resin material to provide a liquid crystal display device having a liquid crystal region with a good orientation condition. When the irradiation is conducted at a temperature at which the mixed material is isotropic, the mixed material is gradually cooled to room temperature after the irradiation. The cooling is usually performed in a gradual cooling oven. The cooling rate is preferably in the range of 3° C./h to 20° C./h, more preferably in the range of 5° C./h to 10° C./h. Optionally, after cooling, the display medium in which the

TABLE 1

| Material | Irgacure651 | p-phenyl styrene | Stearyl acrylate | HDDMA | Resin material | Liquid crystal material |
| --- | --- | --- | --- | --- | --- | --- |
| Composition(%) | 0.4 | 1.6 | 1.0 | 4.0 | 7 | 93 |

TABLE 2

| | Embodiment 1 | Embodiment 2 | Embodiment 3 |
| --- | --- | --- | --- |
| Aperture ratio (%) | 87 | 75 | 80 |
| Resin content (%) | 7 | 16 | 10 | polymer wall 4 is formed may further be irradiated with ultraviolet light. Such further ultraviolet irradiation enables the remaining unreacted resin material, if any, to be sufficiently polymerized, and also ensures that the polymer is sufficiently crosslinked.

Thereafter, a polarizing plate (not shown) is provided on each of the sides of the substrates 1a and 1b opposite to the display medium, and also a phase deference plate (not shown) is provided between either of the substrates and the polarizing plate formed on said substrate to provide a liquid crystal display device (a STN mode liquid crystal display device in the present embodiment).

The liquid crystal display device thus obtained was actually observed with a microscope. The liquid crystal display device having excellent orientation condition was obtained in which the liquid crystal material was gathered in the pixel portion to form the liquid crystal region 3, and also no polymer remained at the interface between the liquid crystal region 3 and the alignment film. In the liquid crystal display device, the polymer wall 4 was formed in the non-pixel portion and no liquid crystal material was trapped inside the polymer wall. Moreover, the polymer wall was not undesirably formed over the pixel portion, and the liquid crystal region 3 having approximately the same shape and the same area as each pixel was formed in the pixel portion.

the resin content y (%) of the mixed material satisfies the range, $0.3*(100-80)=6.0 \leq 10 \leq (100-80)=20$ for the pixel aperture ratio x (%) of the liquid crystal display device.

When the liquid crystal display device thus fabricated was observed in the same manner as in Embodiment 1, a single liquid crystal region having the shape and area approximately corresponding to each pixel was surrounded by the polymer wall in each liquid crystal region. Moreover, the polymer wall was formed in the non-pixel portion, and was not undesirably formed over the pixel portion.

Embodiments 4–9 and Comparative Examples 1–4

Liquid crystal display devices were prepared by the same procedure as described in Embodiment 1 except that the pixel aperture ratio x (%) of the liquid crystal display device is 80 (%), and the resin contents y (%) of the mixed material are those shown in the following Table 3. The breakage amount (amount of incomplete polymer walls) and the remaining polymer amount (polymer remaining in the pixel portion after irradiation) of each of the resulting liquid crystal display devices was evaluated, and an overall evaluation was conducted based on tha evaluation items shown in Table 3. The following Table 3 shows the evaluation results (The details of the evaluation will be discussed below).

TABLE 3

| | Composition wt % | | | | | | Evaluation items | | | |
|---|---|---|---|---|---|---|---|---|---|---|
| | Liquid crystal material | Initiator | Compound A | HDDMA | Resin content y(%) | Z | Breakage amount | Remaining polymer amount | Orientation condition | Overall evaluation |
| Comparative example 1 | 96.0 | 0.5 | 0.0 | 3.5 | 4.0 | 0.2 | X | ⊚ | ⊚ | X |
| Comparative example 2 | 95.0 | 0.5 | 0.3 | 4.2 | 5.0 | 0.25 | Δ | ⊚ | ⊚ | Δ |
| Embodiment 4 | 94.0 | 0.5 | 1.3 | 4.2 | 6.0 | 0.3 | ○ | ⊚ | ⊚ | ○ |
| Embodiment 5 | 92.0 | 0.5 | 3.3 | 4.2 | 8.0 | 0.4 | ○ | ⊚ | ⊚ | ○ |
| Embodiment 6 | 90.0 | 0.5 | 5.3 | 4.2 | 10.0 | 0.5 | ⊚ | ⊚ | ⊚ | ⊚ |
| Embodiment 7 | 86.0 | 0.5 | 9.3 | 4.2 | 14.0 | 0.7 | ⊚ | ⊚ | ⊚ | ⊚ |
| Embodiment 8 | 84.0 | 0.5 | 11.3 | 4.2 | 16.0 | 0.8 | ⊚ | ○ | ⊚ | ○ |
| Embodiment 9 | 80.0 | 0.5 | 15.3 | 4.2 | 20.0 | 1.0 | ⊚ | ○ | ⊚ | ○ |
| Comparative example 5 | 78.0 | 0.5 | 17.3 | 4.2 | 22.0 | 1.1 | ⊚ | Δ | ⊚ | Δ |
| Comparative example 4 | 76.0 | 0.5 | 19.3 | 4.2 | 24.0 | 1.2 | ⊚ | X | ⊚ | X |

Embodiment 2

A liquid crystal display device was fabricated by the same procedure as described in Embodiment 1 except that the pixel aperture ratio x (%) of the liquid crystal display device and the resin content y (%) of the mixed material are those shown in the above-described Table 2. As shown in Table 2, the resin content y (%) of the mixed material satisfies the range, $0.3*(100-75)=7.5 \leq 16 \leq (100-75)=25$ for the pixel aperture ratio x (%) of the liquid crystal display device.

When the liquid crystal display device thus fabricated was observed in the same manner as in Embodiment 1, a single liquid crystal region having the shape and area approximately corresponding to each pixel was surrounded by the polymer wall in each liquid crystal region. Moreover, the polymer wall was formed in the non-pixel portion, and was not undesirably formed over the pixel portion.

Embodiment 3

A liquid crystal display device was fabricated by the same procedure as described in Embodiment 1 except that the pixel aperture ratio x (%) of the liquid crystal display device and the resin content y (%) of the mixed material are those shown in the above-described Table 2. As shown in Table 2, In Table 3, z is a value determined by $z=y/(100-x)$ (x is the pixel aperture ratio of the liquid crystal display device, and y is the resin content).

Also, the compound A is an acrylate represented by the following chemical formula (III) which has a backbone similar to that of a liquid crystal:

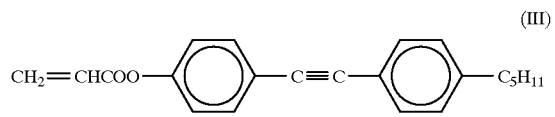

(III)

As shown in Table 3, the resin content y (%) of the mixed material satisfies the range, $0.3*(100-x) \leq y \leq (100-x)$ for the pixel aperture ratio x (%) of the liquid crystal display device in each of the liquid crystal display devices of Embodiments 4–9. On the other hand, the resin content y (%) of the mixed material does not satisfy the range, $0.3*(100-x) \leq y$ for the pixel aperture ratio x (%) of the liquid crystal display device in each of the liquid crystal display devices of Comparative Examples 1 and 2, while the resin content y (%) of the mixed material does not satisfy the range, $y \leq (100-x)$ for the pixel aperture ratio x (%) of the liquid crystal display device in each of the liquid crystal display devices of Comparative Examples 3 and 4.

The following illustrates the details of the evaluation of the liquid crystal display devices.

The breakage amount which is a ratio of the number of the sides of the broken or incomplete polymer walls to the total number of sides of the polymer walls surrounding the pixel (i.e., breakage percentage) is evaluated by a criterion shown in the following Table 4:

TABLE 4

| Breakage percentage (%) | Evaluation |
|---|---|
| Less than 1 | ⊚ |
| 1 ~ 10 | ○ |
| 10 ~ 50 | Δ |
| More than 50 | × |

The remaining polymer amount is an amount of the polymer pieces remaining in the pixel portion and the polymer wall undesirably formed over the pixel portion, and evaluated by ⊚ for a ratio of less than 1% of the area of the undesirably formed polymer wall to the area of the pixel portion, ○ for a ratio of 1% to 3%, Δ for a ratio of 3% to 10%, and x for a ratio of more than 10%.

The orientation condition is evaluated by ⊚ for a ratio of less than 1% of the area of the poorly oriented region to the area of the pixel portion, ○ for a ratio of 1% to 3%, Δ for a ratio of 3% to 10%, and x for a ratio of more than 10%.

The overall evaluation is made by ⊚ for those marked ⊚ in all of the above-described breakage amount, remaining polymer amount and orientation condition, x for those marked x in at least one of these, Δ for those marked Δ in at least one of these, and ○ for those marked ○ in at least one of these.

Figure 2:
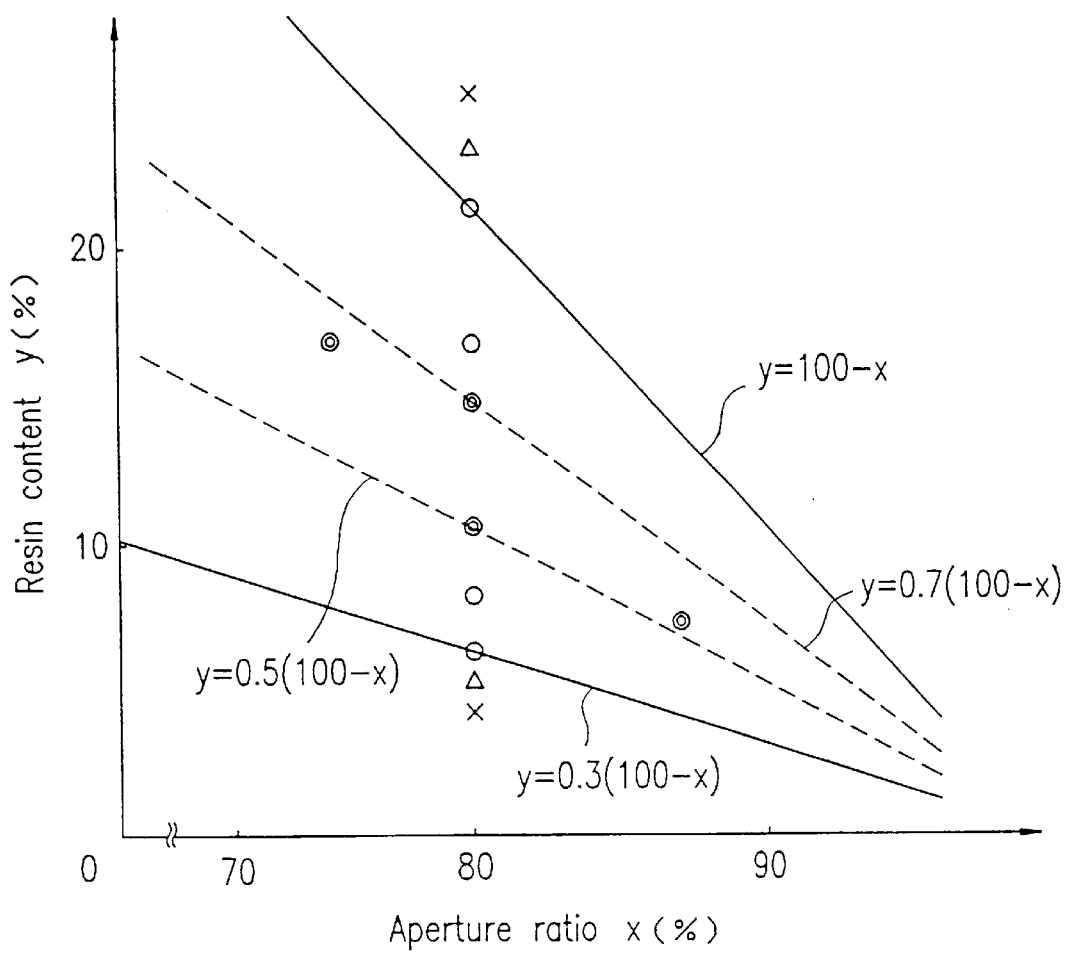
FIG. 2 is a graph showing the characteristics of the liquid crystal display device, when varying the pixel aperture ratio x (%) of the liquid crystal display device and the resin content y (%) of the mixed material containing the liquid crystal material and the resin material.
Figure 3A:
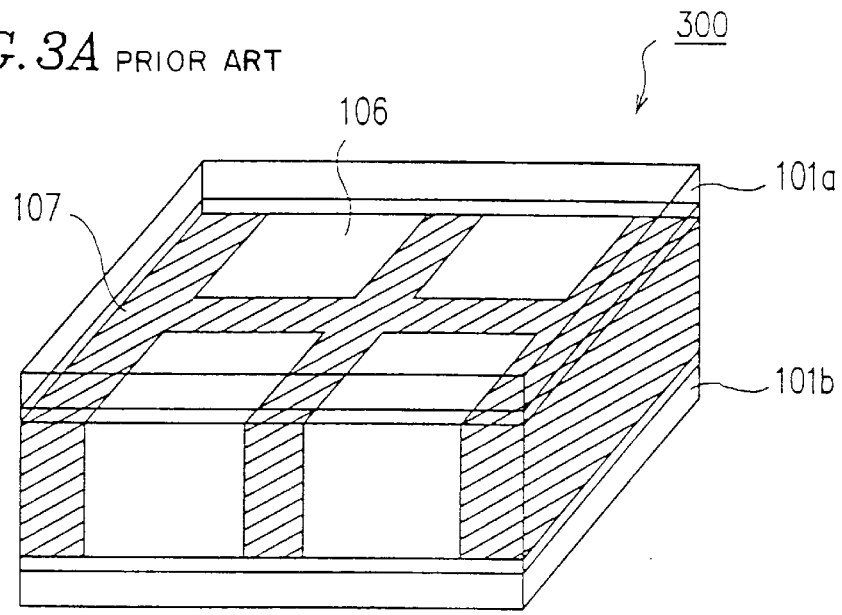
FIG. 3A is a schematic perspective view showing a conventional liquid crystal display device.
Figure 3B:
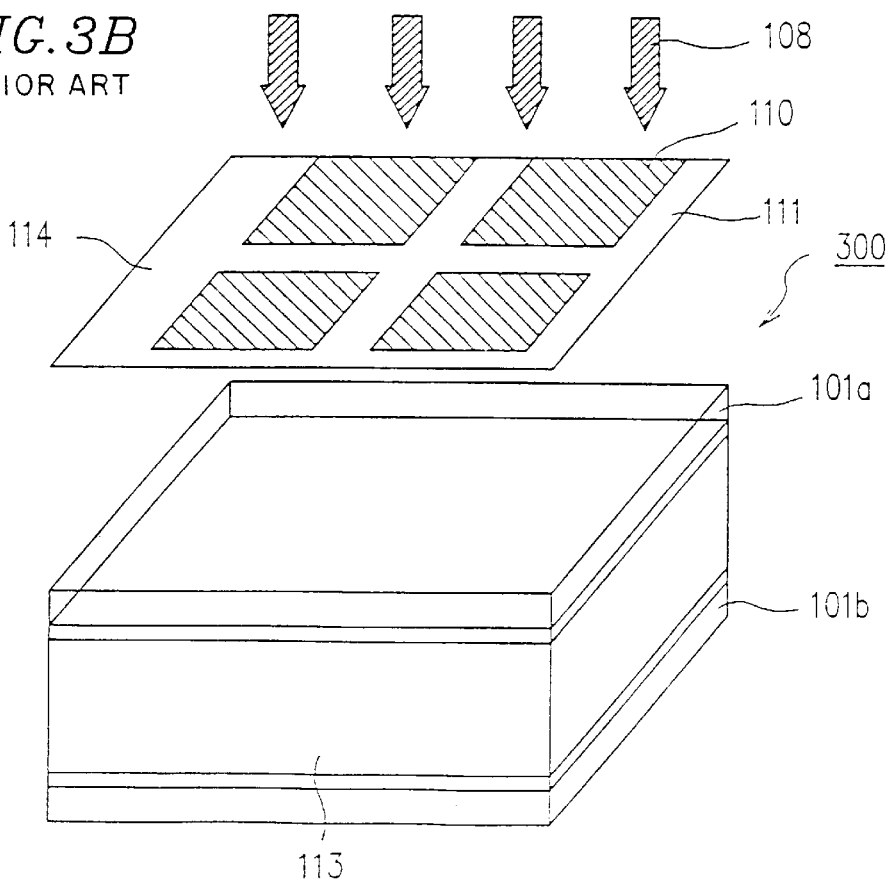
FIG. 3B is a schematic perspective view illustrating a process for fabricating the liquid crystal display device of FIG. 3A.

FIG. 2 is a graph showing the overall evaluation results of the liquid crystal display devices, when varying the pixel aperture ratio x (%) of the liquid crystal display device and the resin content y (%) of the mixed material containing the liquid crystal material and the resin material.

As can be seen from the above-described Table 3 and FIG. 2, the liquid crystal display device satisfying the range, $0.3*(100-x) \leq y \leq (100-x)$ provides less breakage of the polymer wall, as well as less undesirable formation of the polymer wall over the pixel portion and fewer remaining the polymer pieces in the liquid crystal region (i.e., having ⊚ or ○ for all of the evaluation items). Furthermore, the liquid crystal display device satisfying the range, $0.5*(100-x) \leq y \leq 0.7*(100-x)$ hardly provides any breakage of the polymer wall, and undesirable formation of the polymer wall over the pixel portion as well as leaving the polymer pieces in the liquid crystal region (i.e., having ⊚ for all of the evaluation items). Moreover, as can be seen from Table 3, the use of the compound A (an acrylate having a backbone similar to that of a liquid crystal) provides an excellent orientation condition of the liquid crystal, even when the resin content y (%) of the mixed material is widely varied. Therefore, it is to be understood that it is possible to widely vary the resin content y (%) of the mixed material without affecting the properties of the resulting liquid crystal display device.

The above-described Embodiments and Comparative Examples illustrate a liquid crystal display device which displays in a simple matrix driving manner and has a display medium comprising a STN mode liquid crystal region surrounded by a polymer wall, but the present invention is also applicable to a liquid crystal display device using other driving methods or display modes. For example, the present invention is applicable to a liquid crystal display device which displays in an active driving manner using a TFT (thin film transistor), an MIM (metal insulator metal), and the like, and also applicable to a liquid crystal display device having a display medium comprising a liquid crystal region used for TN mode, FLC mode, ECB mode, or light-scattering mode, and the like, and a polymer wall surrounding the liquid crystal region. The present invention is also applicable to a liquid crystal display device performing a color display by the formation of a color filter or black matrix. Moreover, the present invention is applicable to both a transmission-type liquid crystal display device and a reflection-type liquid crystal display device.

The substrate materials that can be used for the liquid crystal display device of the present invention are not specifically limited, but include any light-transmitting transparent solid materials. Examples of substrate materials include glass plates, and plastic films. Also, when one of a pair of substrates is transparent, a metal film, etc., may be formed on the other substrate.

According to the present invention, since a liquid crystal display device comprises a liquid crystal region and a polymer wall surrounding the liquid crystal region obtained by preparing a mixed material in such a manner that the resin content y (%) of the mixed material satisfies the range, $0.3*(100-x) \leq y$ for the pixel aperture ratio x (%) of the liquid crystal display device, the liquid crystal display device has adequate impact resistance and pressure resistance against a pressure such as a pen input. Therefore, the orientation of the liquid crystal molecules is not disturbed by the pressure such as a pen input, and the like, which results in a liquid crystal display device having a less uneven display as well as excellent display quality.

Also, according to the present invention, the undesirable formation of the polymer wall over the pixel portion and the remaining of polymer pieces or resin materials in the pixel portion (i.e., the liquid crystal region) are greatly reduced by preparing the mixed material in such a manner that the resin content y (%) of the mixed material satisfies the range, $y \leq (100-x)$ for the pixel aperture ratio x (%) of the liquid crystal display device, which results in a liquid crystal display device having a higher aperture ratio (brighter display) as well as excellent display properties. Moreover, since the amounts of the photopolymerization initiator and the photopolymerizable monomer remaining in the liquid crystal region are reduced after the formation of the polymer wall, the reduction of the response speed of the liquid crystal can be suppressed.

In a preferred embodiment, the resin material contains an acrylate or methacrylate having a backbone similar to that of a liquid crystal. In this case, because such an acrylate or methacrylate is highly compatible with the liquid crystal material, it is possible to widely vary its content in the mixed material. Therefore, it is possible to widely vary the resin content y (%) of the mixed material without affecting the properties (such as electro-optical properties, thermal resistance and impact resistance) of the resulting liquid crystal display device. Thus, the resin content y (%) of the mixed material can readily be adjusted for the pixel aperture ratio x (%) of the liquid crystal display device in such a manner that the liquid crystal region is provided as approximately corresponding to the pixel portion and the polymer wall is provided as approximately corresponding to the non-pixel portion.

In another preferred embodiment, the resin material contains at least one of a polyfunctional (bifunctional or higher) acrylate and methacrylate. In this case, since a polymer having a crosslinked structure is obtained by the polymerization of the resin material, the resulting polymer after the polymerization has a very different molecular structure from that of the resin material (monomer, dimer, oligomer, and the like) before the polymerization. The great difference in the molecular structure makes the polymer having a crosslinked structure difficult to dissolve in the liquid crystal. Therefore, it is possible to desirably phase-separate the liquid crystal material and the photopolymerized resin (i.e., the polymer), which results in a liquid crystal display device having excellent display qualities due to the reduction of poorly oriented liquid crystal. Also, the use of the polyfunctional acrylate or methacrylate provides a polymer wall having excellent thermal resistance, because the resulting polymer is crosslinked, which results in a highly reliable liquid crystal display device.

According to the present invention, a liquid crystal display device having such excellent properties as described above can be obtained by only adjusting the content of the resin material in the mixed material without any need for a special thin layer or a special fabrication process. That is, according to the present invention, a liquid crystal display device which provides excellent display quality, impact resistance as well as pressure resistance can be obtained at a low cost with high productivity.

The liquid crystal display device of the present invention may preferably be used for a portable information terminal having a pen-input function, and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a pair of substrates and a display medium interposed therebetween, said display medium including a liquid crystal region and a polymer wall surrounding said liquid crystal region, wherein said display medium is formed by injecting between said substrates a mixed material containing a liquid crystal material and a resin material which includes at least photopolymerizable monomer, and irradiating said mixed material with light, and wherein a content y (%) of said resin material in said mixed material has a relationship, $$0.3*(100-x) \leq y \leq (100-x)$$

for a pixel aperture ratio x (%).

2. A liquid crystal display device according to claim 1, wherein the content y (%) of said resin material in said mixed material has a relationship, $$0.5*(100-x) \leq y \leq 0.7*(100-x)$$

for the pixel aperture ratio x (%).

3. A liquid crystal display device according to claim 1, wherein said resin material contains at least one of an acrylate and a methacrylate having a backbone similar to that of a liquid crystal.

4. A liquid crystal display device according to claim 1, wherein said resin material contains at least one of a bifunctional or higher acrylate and methacrylate.

5. A liquid crystal display device according to claim 1, wherein said resin material further includes a photopolymerization initiator.

6. A liquid crystal display device according to claim 1, wherein the display medium is formed such that a breakage percentage of the polymer wall is less than 10%.

7. A liquid crystal display device according to claim 1, wherein the display medium is formed such that a remaining polymer amount in a pixel portion is less than 3%.

8. A liquid crystal display device according to claim 1, wherein the display medium is formed such that a ratio of an area of an undesirably formed polymer wall to an area of a pixel portion is less than 3%.

9. A method for fabricating a liquid crystal display device including a pair of substrates and a display medium interposed therebetween, said display medium including a liquid crystal region and a polymer wall surrounding the liquid crystal region, the method comprising the steps of:

injecting between said substrates a mixed material containing a liquid crystal material and a monomer material which includes at least photopolymerizable monomer; and irradiating with light a prescribed location of said substrates between which said mixed material has been injected so as to form the display medium, wherein a content y (%) of said resin material in said mixed material has a relationship, $$0.3*(100-x) \leq y \leq (100-x)$$

for a pixel aperture ratio x (%).

10. A method according to claim 9, wherein the content y (%) of said resin material in said mixed material has a relationship, $$0.5*(100-x) \leq y \leq 0.7*(100-x)$$

for the pixel aperture ratio x (%).

11. A method according to claim 9, wherein said resin material contains at least one of an acrylate and a methacrylate having a backbone similar to that of a liquid crystal.

12. A method according to claim 9, wherein said resin material contains at least one of a bifunctional or higher acrylate and methacrylate.

13. A method according to claim 9, wherein said resin material further includes a photopolymerization initiator.

14. A method according to claim 9, wherein the display medium is formed such that a breakage percentage of the polymer wall is less than 10%.

15. A method according to claim 9, wherein the display medium is formed such that a remaining polymer amount in a pixel portion is less than 3%.

16. A method according to claim 9, wherein the display medium is formed such that a ratio of an area of an undesirably formed polymer wall to an area of a pixel portion is less than 3%.

* * * * *